Patented Dec. 19, 1950

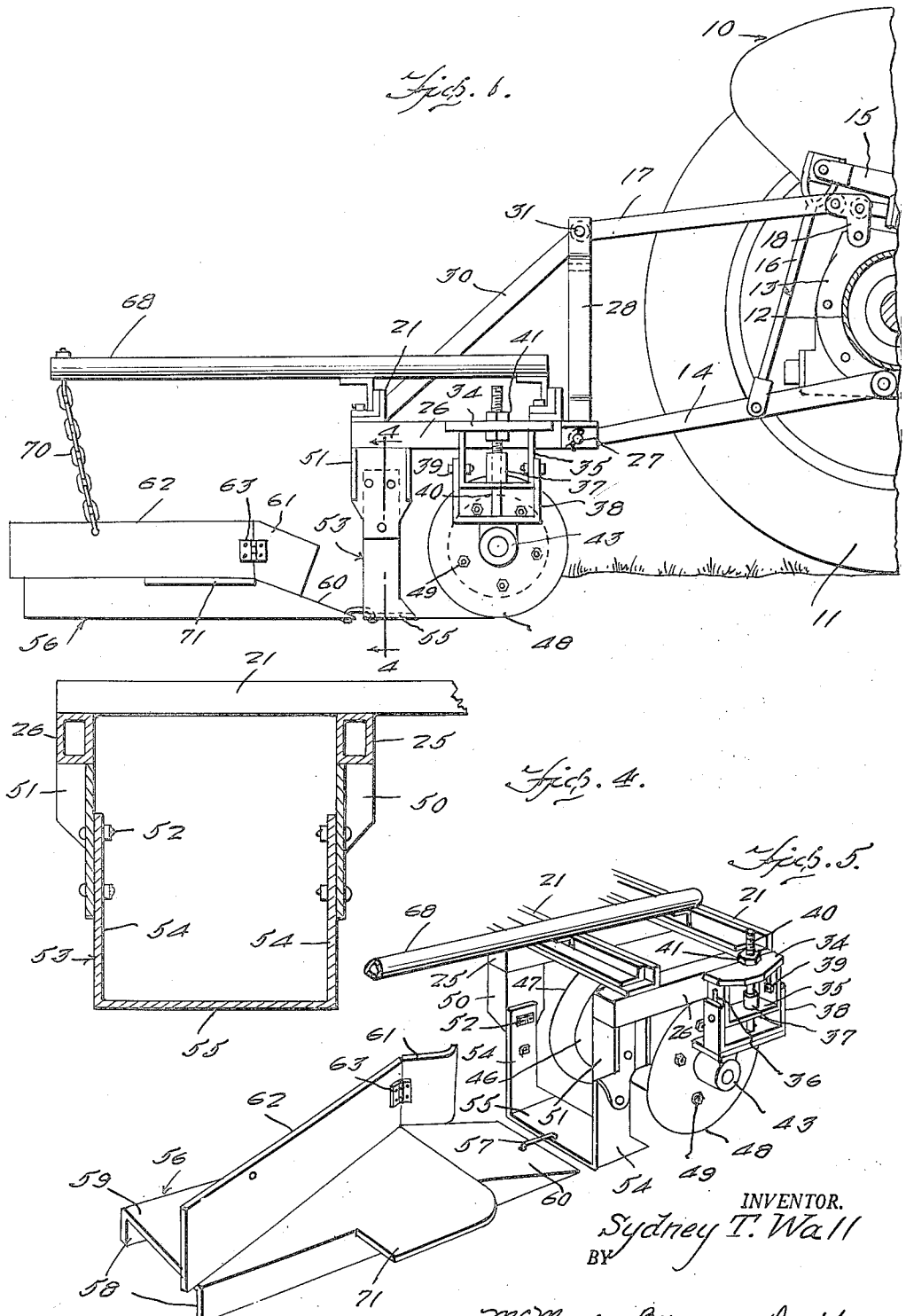

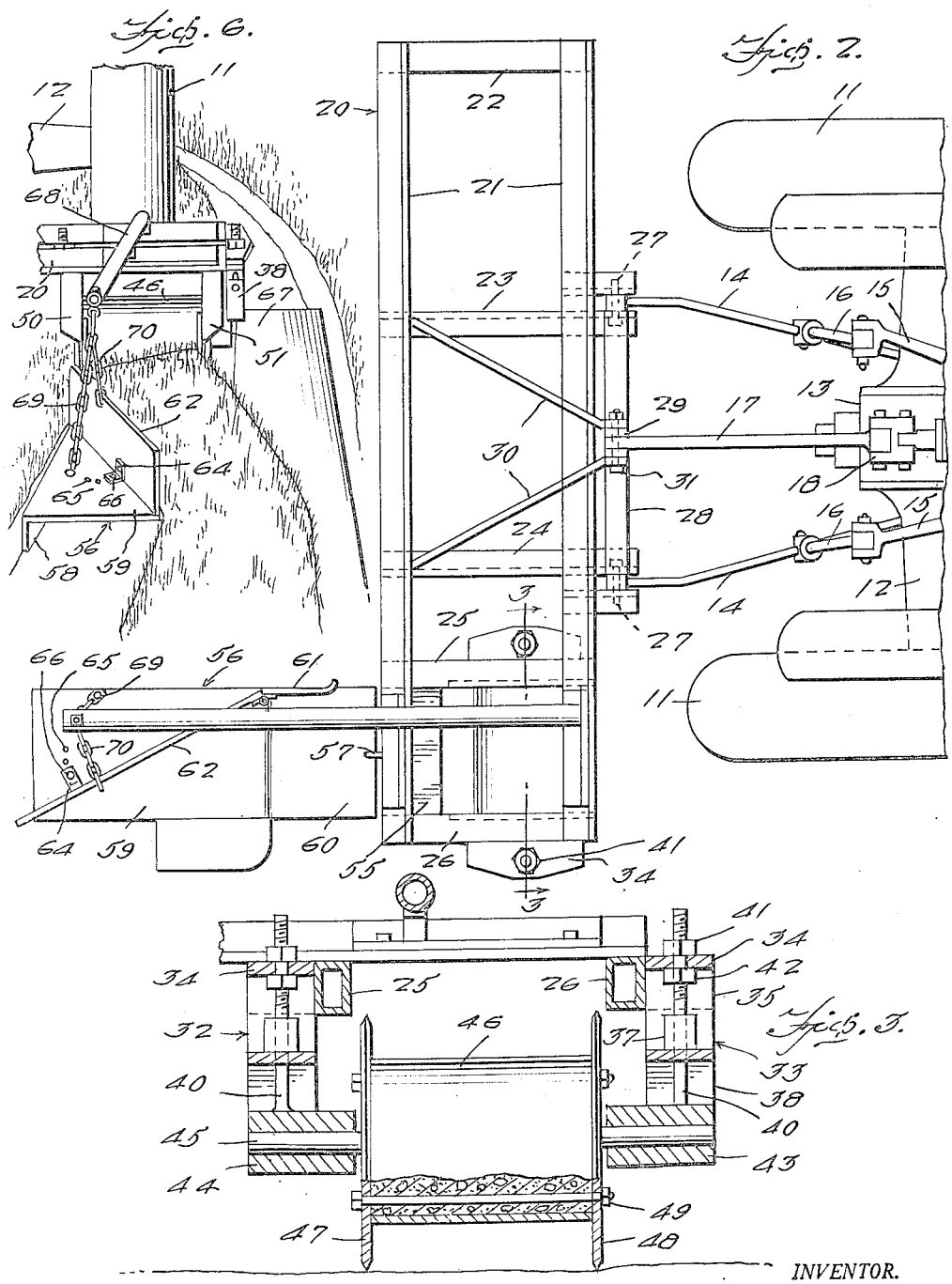

2,534,838

UNITED STATES PATENT OFFICE 2,534,838

SOD CUTTER

Sydney T. Wall, Ouachita, La.

Application February 1, 1949, Serial No. 73,917

6 Claims. (Cl. 97—226)

This invention relates to sod cutters, and more particularly to a sod cutter for cutting sod into long, narrow strips and freeing such strips from the ground for transportation from the place where the sod is grown to a place where it is to be relaid.

It is among the objects of the invention to provide an improved sod cutter which can be quickly and easily attached to a suitable tractor equipped with power-operated lift mechanism, can be raised as a unit by the lift mechanism of the tractor to inoperative position and lowered to operative, sod-cutting position, is effective to cut the sod into long, narrow strips, separate such strips from the ground and move them laterally away from the edge of the uncut sod without breaking the strips, and will place the strips on suitable planks for transportation, if desired, which is fully adjustable to cut sod strips of different thickness and may be easily modified to cut strips of different widths, and which is simple, durable and economical in construction, highly efficient in use and can be used on uneven ground and for cutting curved strips as well as for cutting straight strips on level ground.

Other objects and advantages will become apparent from a consideration of the following description and the appended claims in conjunction with the accompanying drawings, wherein:

Figure 1 is a side elevation of a sod cutter illustrative of the invention and the rearward portion of a cutter-towing tractor;

Figure 2 is a top plan view of the sod cutter and tractor portion illustrated in Figure 1;

Figure 3 is a longitudinal cross-section of a fragmentary portion of the cutter, taken substantially on the line 3—3 of Figure 2;

Figure 4 is a transverse cross-section of a portion of the cutter taken substantially on the line 4—4 of Figure 1;

Figure 5 is a perspective view of the cutter with a portion of the cutter frame omitted;

Figure 6 is a somewhat diagrammatic perspective view showing the cutter in operation.

With continued reference to the drawings, the tractor illustrated and generally indicated at 19 is of conventional construction and may be any usual farm tractor equipped with power-operated implement lift mechanism or may be a "jeep" tractor similarly equipped.

The tractor illustrated has a pair of rear wheels 11 mounted at respectively-opposite ends of a rear axle 12 which includes the usual transmission and differential mechanism 13 drivingly connected with the tractor engine, not illustrated. The illustrated tractor has a pair of spaced-apart tension links 14 pivotally connected at their front ends to the tractor adjacent the rear axle 12 and extending rearwardly of the axle, a pair of hydraulically-operated lift arms 15 respectively connected to the tension links 14 by respective lift struts 16 and a compression link 17 disposed between and above the tension links 14 and connected at its front end to a valve mechanism 18 which controls the hydraulic operating means for the lift arms 15. The lift arms 15 are effective to raise and lower the rearward ends of the tension links 14 and compression link 17 to thereby raise and lower an implement attached to the rearward ends of these links and also to automatically maintain the implement at a desired constant operating depth as is well known to the art.

The sod cutter comprises an elongated, rectangular frame, generally indicated at 20, having a length somewhat greater than the tread width of the tractor rear wheels 11 and adapted to be connected to the rear ends of the links 14 and 17 and to extend transversely of the tractor to the rear of the latter.

This frame comprises a pair of spaced-apart, substantially parallel side members which may conveniently be formed from structural angle iron of the proper size, a left-hand end cross-member 22 and two spaced-apart intermediate cross-members 23 and 24 of the same structural iron as the side members 21, and a pair of spaced-apart, substantially parallel cross-members 25 and 26 which are preferably formed of tubular stock of rectangular cross-sectional shape, although other structural shapes may be used if desired without in any way exceeding the scope of the invention. The two intermediate cross-members 23 and 24 are preferably symmetrically disposed at respectively-opposite sides of the mid-length location of the frame 20, the tubular cross-member 26 is disposed at the right-hand end of the frame, and the tubular cross-member 25 is spaced from the member 26 a distance substantially equal to the desired width of the sod strips.

The cross-members 23 and 24 extend forwardly of the frame and are apertured to receive respective pivot pins 27. A V-shaped member 28 is connected at its ends to the forwardly-projecting portions of the cross-members 23 and 24 by the pivot pins 27, if desired, and is provided at its apex with a pair of spaced-apart, upwardly-extending, apertured lugs 29 which receive the rear apertured end of the compression link 17 between them. A pair of diagonal braces 30 extend respectively from the intersections of the cross-members 23 and 24 and the rear frame side member 21 to the lugs 29 and are provided with apertured ends which receive a connecting pin 31 which extends through the corresponding ends of the braces 30, the lugs 29 and the rearward end of the compression link 17. The member 28 and the two braces 30 together constitute an upwardly-extending, pyramidal bracket on the frame 21 for operatively connecting the frame to the rearward end of the compression link 17 of the implement-lifting equipment of the tractor.

Respective, adjustable journal brackets, generally indicated at 32 and 33, are secured to and depend from the cross-members 25 and 26, respectively, near the forward side of the frame. As these two journal brackets are substantially identical in construction, except that one is right-hand and the other left-hand, a detailed description of only one is considered sufficient for the purposes of this disclosure, and the bracket 33 has been selected for detailed description.

An apertured lug 34 is secured to and projects outwardly from the cross-member 26 in a direction opposite to cross-member 26, and a U-shaped stud 35 is secured at its ends to the ends of the lug 34 and depends therefrom. This U-shaped member 35 has respective elongated slots 36 in its opposite sides and has in its bight a central aperture surrounded by an upwardly-extending, annular boss 37. A second U-shaped member 38 slidably receives the member 35 between its opposite sides, and the sides of the bracket member 38 carry respective bolts 39 which extend through corresponding slots 36 in the inner bracket member 35. A pin 40 is secured at its lower end to the bight of the outer U-shaped bracket member 38 substantially centrally of the latter and extends upwardly through the boss 37 and through the aperture in the lug 34 and is provided near its upper end with external screw-threads which receive clamp nuts 41 and 42, positioned one above and one below the lug 34, to secure the outer bracket member 38 in adjusted vertical position relative to the inner bracket member 35. A tubular journal box 43 is secured to the under side of the bight of the outer U-shaped bracket member 38 and has a bore in alignment with the bore of the corresponding journal box 44 at the bottom end of the opposite bracket 32.

A shaft 45 is journaled at its opposite ends in the journal boxes 43 and 44 and a cylinder 46 concentrically surrounds the shaft 45 between the two journal boxes and is filled with a weighting material, such as concrete, to add weight to the rotary cutter of which the cylinder 46 is a part. Respective sharp-edged discs 47 and 48 are disposed against the opposite ends of the cylinder 46 and are secured together and to the cylinder by through bolts 49 extending through the cylinder at angularly-spaced-apart location there-around. The discs 47 and 48 have a diameter greater than the diameter of cylinder 46 by an amount which is twice the maximum depth of sod cuts desired, so that the two discs extend radially outwardly of the cylinder to an extent equal to the maximum desired depth of cut.

The shaft 45, the cylinder 46 and the two discs 47 and 48, together with the bolts 49 and the cylinder-filling material, constitute a rotatable cutter for severing the edges of a strip of sod from adjacent uncut sod. The distance between the two discs 47 and 48 determines the width of the sod strip, and this may be varied by substituting different rotatable cutters of different lengths in the cutter-supporting brackets 32 and 33. The depth at which the discs 47 and 48 operate is controlled by threading the pins 40 upwardly or downwardly through the corresponding frame-carried lugs 34.

Respective side plates 50 and 51 are secured to the cross-members 25 and 26 adjacent the rearward ends of the latter and depend from the frame cross-members. These side plates are preferably of channel-shaped cross-section and are provided with apertures in the web portions thereof which receive bolts 52 for attaching a stirrup-shaped cutter, generally indicated at 53, to these side plates.

The cutter 53 has straight sides 54 apertured to receive the bolts 52 and has a straight bight 55 which is substantially parallel to the cylinder 46 and positioned below and to the rear of the latter, the legs 54 of this cutter being in longitudinal alignment with the corresponding discs 47 and 48 of the rotatable cutter. The bight 55 of the cutter 53 has a sharpened forward edge for severing a strip provided by the discs 47 and 48 from the ground so that a long, narrow strip of free sod is left behind the cutter 53.

A sled, generally indicated at 56, is disposed in trailing relationship to the cutter 53 and is pivotally connected to the cutter by a link 57 extending through apertures provided respectively in the bight 55 of the cutter 53 and the top wall of the sled adjacent the forward end of the latter.

The sled 56 has a pair of substantially parallel runners 58 spaced apart a distance somewhat less than the width of the cutter 53 so that the sled has a limited freedom of movement in a furrow from which a sod strip has been cut. A flat, top wall 59 extends from the rear end of the runners 58 forwardly to a location spaced from the front ends of the runners and is inclined forwardly and downwardly from such location to provide an upwardly and rearwardly-inclined ramp 60 at the forward end of the sled, the forward portions of the runners being tapered along their upper edges in conformity to the inclination of the ramp. A fixed vertical guide portion 61 extends upwardly from the left-hand side of the ramp 60 and has an outwardly-curved forward edge. An adjustable, vertical guide 62 is hinged at its forward end to the rear end of the fixed guide 61 by suitable hinge means 63 and extends rearwardly across the top plate 59 of the sled. The movable guide 62 is held in adjusted position on the sled by an angle clamp 64 secured to the guide 62 near the rear end of the latter and having an aperture therein registrable with a selected one of of a series of apertures 65 provided in the top plate 59 of the sled, and a pin 66 insertable through registering apertures in the bracket 64 and in the top wall of the sled to hold the guide 62 in adjusted angular position relative to the sled.

With this arrangement, as the sod strip passes up the ramp 60 and rearwardly of the sled, it is pushed to the right-hand side of the sled by the guide 62 and laterally displaced from the location from which it was cut.

If desired, suitable planks or boards 67 may be placed on the ground in position to receive the sod strip from the sled 56 so that convenient lengths of sod strips can be suitably supported for handling and transportation, and a shelf 71 extends outwardly from the top wall of the sled opposite the guide 62 to support the sod strip while being moved laterally onto the boards. The shelf has its front end at the rear end of ramp 60 and extends rearwardly along the right-hand edge of the top wall 59 of the sled a distance less than one-half the length of the top wall.

A tubular boom 68 is secured to the upper side of the frame 20 between the frame cross-members 25 and 26 and projecting rearwardly over the sled 56, and a pair of chains 69 and 70 diverge from this boom near the rearward end of the latter and are connected at their lower ends to the left-hand side of the sled and to the adjustable guide 62 so that the sled will be lifted whenever the frame 20 is lifted by the implement-lifting equipment of the tractor.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A sod cutter for attachment to a tractor equipped with drawbar and power-operated implement-lifting mechanism comprising a rectangular, elongated frame having forwardly-extending lugs and an upwardly-extending bracket disposed adjacent the mid-length location thereof for attachment of the frame to tractor drawbar and implement-lift mechanism, said frame having a pair of spaced-apart, substantially parallel transverse members adjacent one end thereof, respective adjustable bearing brackets secured to and depending from said transverse frame members, a rotatable cutter having a shaft journaled at its ends in said bearing brackets, a weighted cylinder concentrically surrounding said shaft and a respective cutting disc concentrically surrounding said shaft at each end of said cylinder, respective side plates secured to and depending from said transverse frame members to the rear of said bearing brackets, a stirrup-shaped blade structure secured to said side plates and having an edged bight positioned below and substantially parallel to the cylinder of said rotatable cutter for severing from the ground a sod strip marginally cut by said rotatable cutter discs, a sled pivotally connected at its front end to said stirrup-shaped cutter and having a rearwardly and upwardly-inclined ramp at its front end for lifting a severed sod strip, and a diagonally-disposed guide on the top of said sled for moving the sod strip laterally of said cutter, a boom extending rearwardly of said frame above said sled, and a flexible strand connecting said boom to said sled adjacent the rearward end of the latter to lift said sled when said frame is lifted by the associated implement-lifting tractor equipment.

2. A sod cutter comprising an elongated rectangular frame, apertured lugs and a bracket on said frame for attaching the latter to a towing tractor, a pair of adjustable journal brackets secured to and depending from said frame in spaced-apart relationship in one end of the latter, a rotatable cutter journaled in said brackets at the bottom ends of such brackets, a stirrup-shaped cutter secured to and depending from said frame to the rear of said rotatable cutter, a sled pivotally connected to said stirrup-shaped cutter in trailing relationship to the latter, and a diagonal guide secured on the upper side of said sled for imparting lateral movement to a strip of sod severed by said rotatable and stirrup-shaped cutters.

3. A sod cutter comprising an elongated rectangular frame, apertured lugs and a bracket on said frame for attaching the latter to a towing tractor, a pair of adjustable journal brackets secured to and depending from said frame in spaced-apart relationship in one end of the latter, a rotatable cutter journaled in said brackets at the bottom ends of such brackets, a stirrup-shaped cutter secured to and depending from said frame to the rear of said rotatable cutter, a sled pivotally connected to said stirrup-shaped cutter in trailing relationship to the latter, a diagonal guide secured on the upper side of said sled for imparting lateral movement to a strip of sod severed by said rotatable and stirrup-shaped cutters, said rotatable cutter comprising a shaft journaled at its opposite ends in said journal brackets, and a pair of spaced-apart discs concentrically mounted on said shaft and provided with sharpened peripheral edges.

4. A sod cutter comprising an elongated rectangular frame, apertured lugs and a bracket on said frame for attaching the latter to a towing tractor, a pair of adjustable journal brackets secured to and depending from said frame in spaced-apart relationship in one end of the latter, a rotatable cutter journaled in said brackets at the bottom ends of such brackets, a stirrup-shaped cutter secured to and depending from said frame to the rear of said rotatable cutter, a sled pivotally connected to said stirrup-shaped cutter in trailing relationship to the latter, a diagonal guide secured on the upper side of said sled for imparting lateral movement to a strip of sod severed by said rotatable and stirrup-shaped cutters, said rotatable cutter comprising a shaft journaled at its opposite ends in said journal brackets, a pair of spaced-apart discs concentrically mounted on said shaft and provided with sharpened peripheral edges, and said stirrup-shaped cutter having a straight bight disposed to the rear of said rotatable cutter and substantially at the level of the bottom edge portions of said discs, said bight having a sharpened forward edge.

5. A sod cutter comprising an elongated rectangular frame, apertured lugs and a bracket on said frame for attaching the latter to a towing tractor, a pair of adjustable journal brackets secured to and depending from said frame in spaced-apart relationship in one end of the latter, a rotatable cutter journaled in said brackets at the bottom ends of such brackets, a stirrup-shaped cutter secured to and depending from said frame to the rear of said rotatable cutter, a sled pivotally connected to said stirrup-shaped cutter in trailing relationship to the latter, a diagonal guide secured on the upper side of said sled for imparting lateral movement to a strip of sod severed by said rotatable and stirrup-shaped cutters, a boom extending rearwardly from said frame above said sled, and flexible means connecting said sled to said boom near the rear end of the latter.

6. A sod cutter comprising an elongated rectangular frame, apertured lugs and a bracket on said frame for attaching the latter to a towing tractor, a pair of adjustable journal brackets secured to and depending from said frame in spaced-apart relationship in one end of the latter, a rotatable cutter journaled in said brackets at the bottom ends of such brackets, a stirrup-shaped cutter secured to and depending from said frame to the rear of said rotatable cutter, a sled pivotally connected to said stirrup-shaped cutter in trailing relationship to the latter, a diagonal guide secured on the upper side of said sled for imparting lateral movement to a strip of sod severed by said rotatable and stirrup-shaped cutters, said sled comprising a pair of substantially parallel, spaced-apart runners, a flat top plate extending forwardly from the rear ends of said runners, and a rearwardly and upwardly-inclined ramp extending from the forward ends of said runners to the forward end of said top plate, and a fixed vertical guide extending upwardly from said ramp at one side of the latter, said adjustable vertical guide extending rearwardly from said fixed vertical guide diagonally across said top plate.

SYDNEY T. WALL.

REFERENCES CITED

The following references are of record in the file of this patent:

UNITED STATES PATENTS

| Number | Name | Date |
|---|---|---|
| 45,926 | Kirk | Jan. 17, 1865 |
| 1,537,412 | Dafferner | May 12, 1925 |

FOREIGN PATENTS

| Number | Country | Date |
|---|---|---|
| 556,859 | Great Britain | Oct. 26, 1943 |
| 729,848 | France | May 3, 1932 |